United States Patent [19]

Tsai

[11] Patent Number: 4,553,349
[45] Date of Patent: Nov. 19, 1985

[54] MOUSETRAP

[76] Inventor: Jen-Fa Tsai, No. 41, Si-Wei St., San Chung City, Taipei Hsien, Taiwan

[21] Appl. No.: 528,180

[22] Filed: Aug. 31, 1983

[51] Int. Cl.$^4$ ............................................. A01M 23/06
[52] U.S. Cl. ............................................. 43/70; 43/73
[58] Field of Search ............ 43/67, 68, 70, 71, 74, 43/111, 73

[56] References Cited

U.S. PATENT DOCUMENTS

| | | | |
|---|---|---|---|
| 117,005 | 7/1871 | Smith | 43/67 |
| 186,624 | 1/1877 | Reed | 43/74 |
| 364,924 | 6/1887 | Harvell | 43/67 |
| 448,313 | 3/1891 | Bassinger | 43/73 |
| 550,147 | 11/1895 | Wells | 43/73 |
| 689,641 | 12/1901 | Douthett | 43/73 |
| 1,017,479 | 2/1912 | Steward | 43/70 |
| 1,122,202 | 12/1914 | Holley | 43/74 |
| 1,384,611 | 7/1921 | Gorniak | 43/70 |
| 2,197,121 | 4/1940 | Blasen | 43/74 |
| 2,274,547 | 2/1942 | Jackson | 43/111 |
| 3,791,065 | 2/1974 | Snow | 43/74 |
| 4,145,834 | 3/1979 | Quigley | 43/73 |
| 4,255,891 | 3/1981 | Chen | 43/68 |
| 4,429,483 | 2/1984 | Murakami | 43/74 |

Primary Examiner—Nicholas P. Godici
Assistant Examiner—M. Jordan
Attorney, Agent, or Firm—Watson, Cole, Grindle & Watson

[57] ABSTRACT

A mousetrap includes a liquid-containing tank and a housing removably positioned on the tank, the housing defining two trap chambers having drop floor sections. A gate which is movable by a motor is movably positioned to cover the opening into one or the other of the trap chambers. When a mouse enters the open trap chamber to eat bait and contacts a sensor of a microswitch, the motor causes the gate to move and trap the mouse in the trap chamber, concurrently causing the drop floor section to be released. The weight of the mouse causes the drop floor to pivot downwardly, resulting in the mouse being dropped in the tank therebelow and drowning. The other trap chamber is in the meantime opened for trapping another mouse and causing it to become drowned.

10 Claims, 3 Drawing Figures

MOUSETRAP

BACKGROUND OF THE INVENTION

1. FIELD OF THE INVENTION

The present invention relates to mousetraps, and more particularly to a mousetrap which has an internal trap chamber and a movable gate which can close an entry opening leading into the trap chamber to trap a mouse which has entered into the trap chamber to eat bait.

2. THE PRIOR ART

Many different constructions of mousetraps are known which are capable of catching mice. However, although they are generally effective in catching a single mouse, they are not useful in catching a plurality of mice because, once a mouse has been caught, this fact will be apparent to subsequent mice, making them extra vigilant and unlikely to come near the mousetrap.

SUMMARY OF THE INVENTION

It is an object of the present invention to provide a mousetrap which is effective in catching and killing a plurality of mice in a continuous and automatic fashion.

The inventive mousetrap includes an upwardly open liquid-containing tank and a housing removably mounted thereover, the housing providing two side-by-side trap chambers having open front ends and movable floors (drop sections). A gate which is movably mounted on the housing to cover the open front end of one or the other of the trap chambers is operated by a motor attached to the housing, which in turn is activated by respective microswitches in each trap chamber. When a mouse enters the open trap chamber to eat bait which has been placed therein and touches the associated microswitch, the motor will cause the gate to move and close the open front end of the chamber. This movement of the gate will cause the drop section to be released, and the weight of the mouse will cause it to pivot downwardly so as to drop the mouse into the liquid in the tank therebelow and drown. At this time, the other trap chamber will be ready for another mouse to enter it and be trapped and killed in the same fashion. Because the mice are killed and then retained outside of the trap chambers, subsequent unsuspecting mice will not be placed on alert that the mousetrap is in any way dangerous for them.

A further understanding of the invention will now be had by reference to the attached drawings, taken in conjunction with the following discussion.

DETAILED DESCRIPTION OF THE PREFERRED EMBODIMENT

Figure 1:
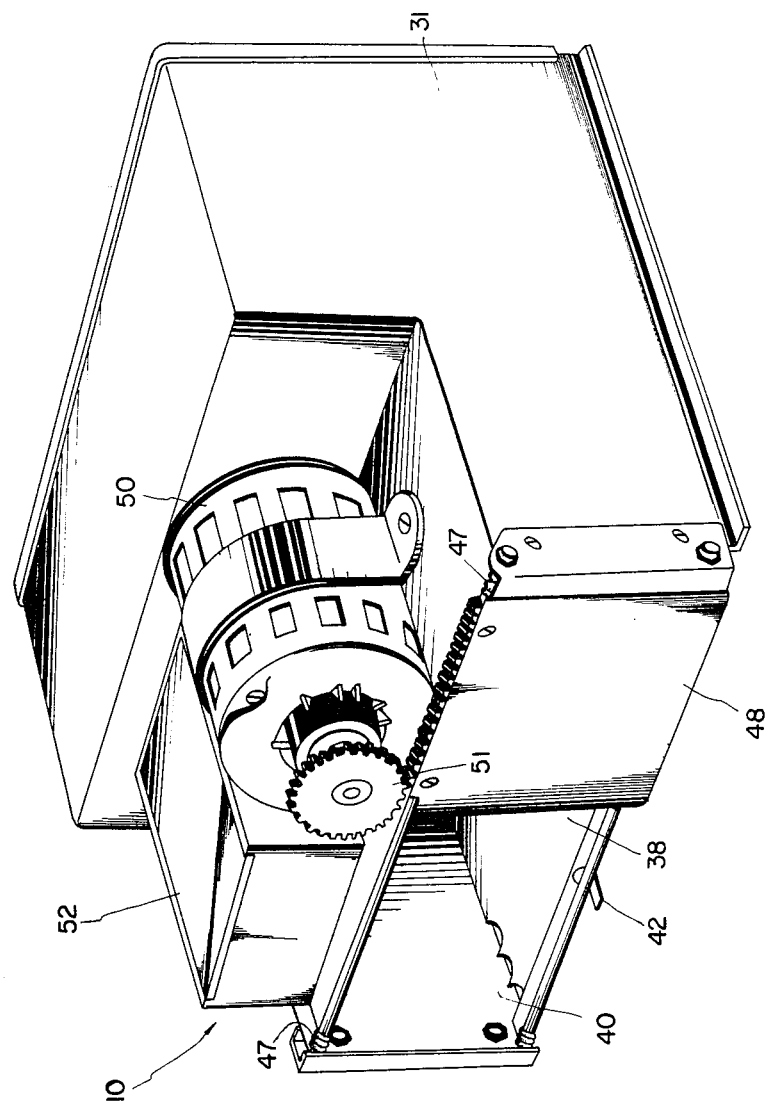
FIG. 1 shows a perspective front view of the upper part of a preferred embodiment of mousetrap according to the present invention.
Figure 2:
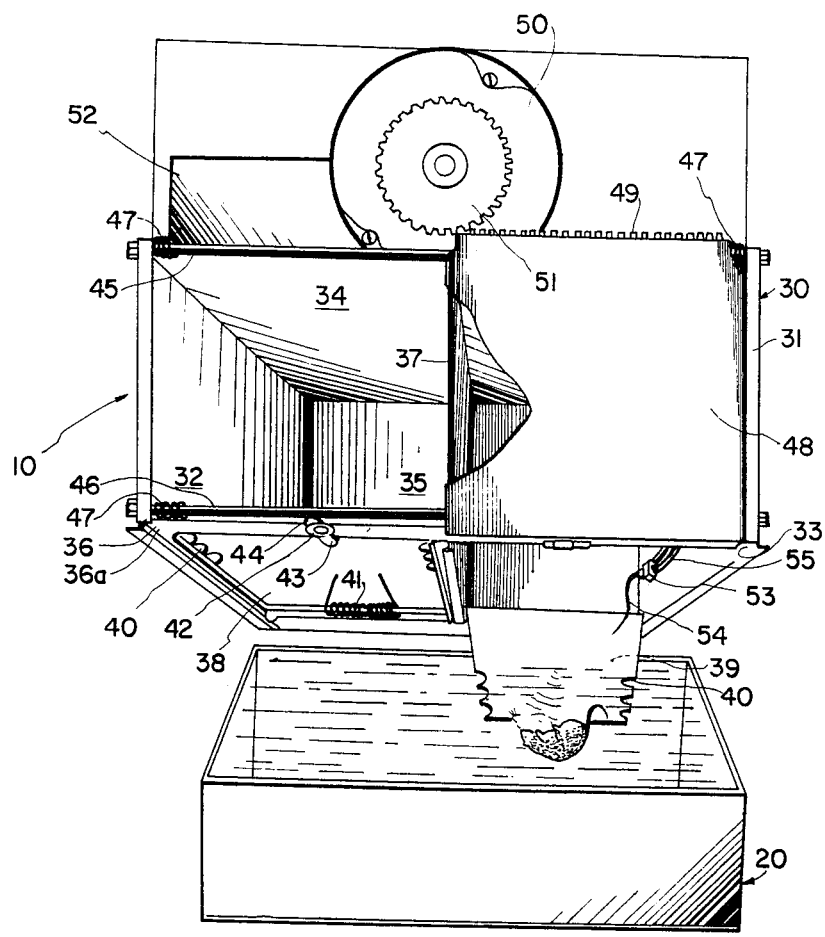
FIG. 2 shows a perspective frontal view of the preferred embodiment of mousetrap, the uppper part being shown separated from the lower tank part, this view showing a mouse falling downwardly from the upper part into the lower tank part.

The inventive mousetrap, generally labeled 10 in FIG. 2, includes an upwardly open liquid-containing tank 20 and an upper part 30 which is removably positionable on the top of the tank 20. The upper part 30 includes a housing 31 which has opposite side walls 32,33, a top wall 34, and openable rear wall 35, a floor 36, an interior partition wall 37 and an open front end. The interior partition wall extends from the floor 36 to the top wall 34 and from the rear wall 35 to the open front end so as to divide the housing into two identical chambers A and B. The floor 36 includes an immovable section 37 and two movable drop sections 38,39 which are located at the forward ends of the respective trap chambers and are pivotably attached to the immovable section 37 along their rear edges. The drop sections include holes 40 near their forward edges. Springs 41 are positioned to contact the respective movable sections to bias them upwardly so as to be coplanar with the immovable section 37 (i.e., to be generally horizontal when the mouse trap is positioned on a surface for use). Elastic latch devices 42 are attached to the immovable floor section 37 adjacent the open front end of the housing, each elastic latch device including a support lip 43 and an actuation lip 44.

Mounted between the opposite side walls 32,33 at the open front end of the housing are two slide rods 45 and 46. Coiled springs 47 are positioned around each slide rod at its opposite ends. A gate 48 is mounted on the slide rods and is slidingly movable therealong so as to cover the open front end of the housing forming the opening into one or the other of the trap chambers A or B. The gate 48 includes teeth 49 along its upper edge.

An electric motor 50 having a cog wheel 51 is mounted on the top wall 34 of the housing together with a power source 52 (e.g. a battery pack). The electric motor can be a D.C. motor or an A.C. motor (when an A.C. motor, the power source 52 includes an A.C. rectifier). The cog wheel 51 is engaged with the teeth 49 of the gate 48 so as to move the gate 48 one way or the other along the slide rods to thus cover the opening into one or the other trap chamber. As the gate 48 moves to cover the opening into a trap chamber, it will contact the actuation lip of the associated latch device, thus causing it to rotate, which in turn will cause the support lip thereof to be moved out of supporting relationship with the associated drop seciton. As such, the drop section will be cause to rotate downwardly by the weight of a mouse in the chamber, i.e., move against the biasing action of the associated spring 41.

Located within each trap chamber is a microswitch 53 having sensor 54, each microswitch being electrically connected by an induction line 55 to the motor 50. When a mouse enters an open trap chamber and contacts the sensor 54, a signal is sent to the motor 50 which will cause it to move the gate 48 so as to cover the opening of the trap chamber containing the mouse to thereby trap the mouse. Because the movement of the gate will cause the associated latch device to rotate and release the associated drop section, the weight of the mouse will cause the drop section to rotate downwardly, resulting in the mouse being dropped into the liquid in the tank 20 therebelow (see FIG. 2). The latch devices will otherwise be oriented to support their associated drop sections. The coil springs 47 at the ends of the slide rods 45,46 will bias the gate 48 such that its teeth 49 engage the cog wheel 51 and enhance the speed with which the gate 48 can be moved from positioning to another.

Figure 3:
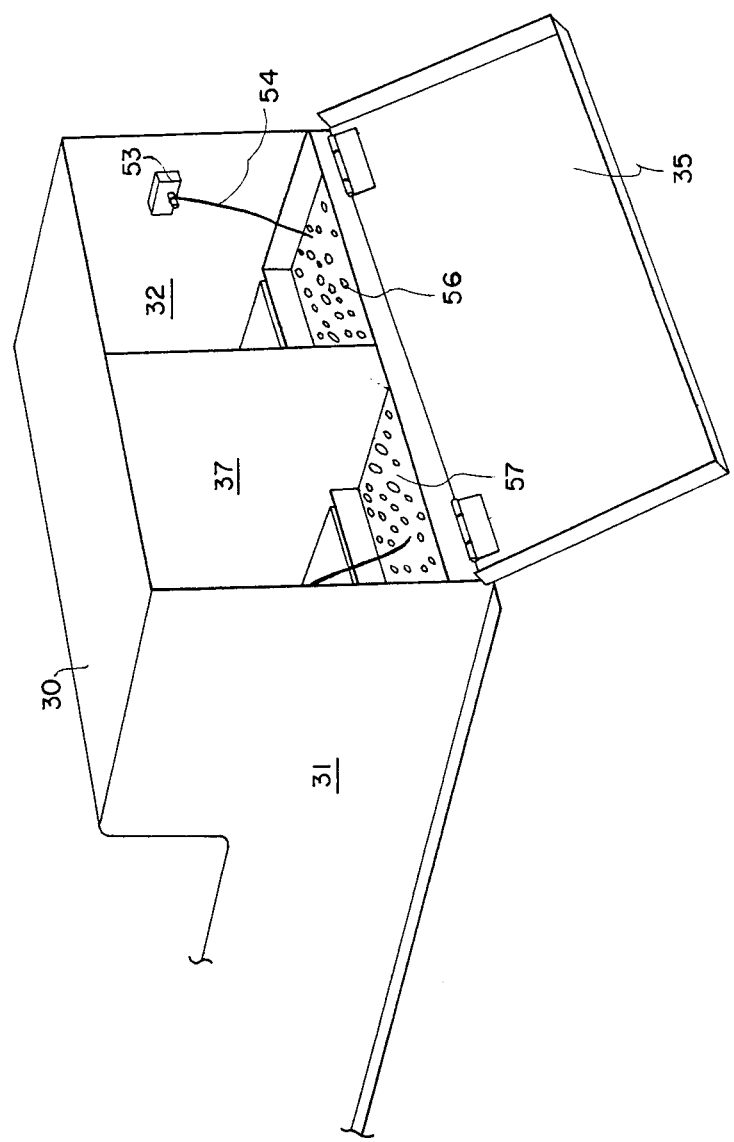
FIG. 3 shows a perspective view of the rear portion of the upper part shown in FIG. 1, the rear wall of the upper part being shown in its open positioning.

As best seen in FIG. 3, the rear wall 35 of the housing 30 is pivotally attached to the floor 36 so as to be openable and enable bait trays 56,57 to be positioned at the rearward ends of the respective trap chambers. The bait in the bait trays is what entices the mice to enter the trap chambers whose front ends are not covered by the gate 48.

Although one preferred embodiment of the invention has now been shown and described, it is obvious the various modifications can be made therein and still fall within the scope of the appended claims.

I claim:

1. A mousetrap for trapping and drowning mice, said mousetrap comprising an upwardly open tank for containing liquid, a housing removably mounted on top of said liquid-containing tank, said housing including opposite side walls, a top wall, an openable rear wall, an interior partition wall, and a floor, said housing having a front end which is open, said interior partition wall extending from said floor to said top wall and from said rear wall to said open front end so as to divide said housing into two identical trap chambers, and said floor including two pivotable drop sections located near said open front end and a two upwardly open bait containers located near said rear wall, one of said drop sections and one of said bait containers being located at the bottom of a respective trap chamber, two slide rods mounted between said opposite side walls of said housing at said open front end thereof, each slide rod having a coiled spring positioned therearound at its opposite ends, a gate slidingly mounted on said slide rods to be horizontally movable for covering the portion of the open front end of said housing forming the opening into one or the other of said trap chambers, said gate including an upper edge with teeth therealong, an electric motor mounted on the top of said housing, said electric motor including a cog wheel which engages the teeth of said gate for horizontally moving said gate, and a microswitch with associated sensor located in each of said trap chambers, each microswitch being connected to said electric motor, such that when a mouse enters the trap chamber which is not covered by said gate to get to the bait in the bait container and contacts said sensor, the associated microswitch will send a signal to said electric motor to cause it to move said gate to cover the opening of the trap chamber in which the mouse is located, the drop section thereafter pivoting to cause the mouse to drop into said water tank to drown, the other trap chamber being concurrently opened for trapping and drowing another mouse.

2. A moustrap as defined in claim 1, including a power source mounted on said housing.

3. A mousetrap as defined in claim 2, wherein said power source consist of a battery pack.

4. A mousetrap as defined in claim 1, wherein said rear wall of said housing includes hinge means for pivotally connecting said rear wall to said floor.

5. A mousetrap as defined in claim 1, wherein each of said drop sections includes holes therein.

6. A mousetrap as defined in claim 2, wherein each of said drop sections includes a first end nearest said open front end of said housing and a second end nearest said rear wall of said housing, and wherein each said drop section is mounted to be pivotable about its second end.

7. A mousetrap as defined in claim 6, including a spring for biasing each of said drop sections upwardly to a generally horizontal orientation.

8. A mousetrap as defined in claim 7, including two elastic latch devices mounted on said floor adjacent the open front end of said housing, each elastic latch including a support lip which can support the first end of a respective drop section, each elastic latch device being biased such that the support lip thereof is positioned to support the first end of the associated drop section when in a generally horizontal orientation.

9. A mousetrap as defined in claim 8, wherein each said elastic latch device includes an actuation lip which is movable by said gate as said gate moves to cover the opening of the associated trap chamber, movement of said actuation lip by said gate causing the support lip of the latch device to move out of a supporting position with respect to the first end of the associated drop section, such that the weight of the mouse on the drop section will cause the drop section to pivot about its second end, causing the mouse to fall into said liquid containing tank therebelow.

10. A mousetrap as defined in claim 1, including an induction line extending from each microswitch into the bait container at the bottom of the associated trap chamber.

* * * * *